No. 781,314. PATENTED JAN. 31, 1905.
G. O. TUCKER.
NUT LOCK.
APPLICATION FILED AUG. 3, 1904.

WITNESSES:
H. G. Dieterich
H. H. Simms

INVENTOR
George O. Tucker
By Knight Bros
Attorneys

No. 781,314. Patented January 31, 1905.

UNITED STATES PATENT OFFICE.

GEORGE OTIS TUCKER, OF CHARLESTON, ILLINOIS.

NUT-LOCK.

SPECIFICATION forming part of Letters Patent No. 781,314, dated January 31, 1905.

Application filed August 3, 1904. Serial No. 219,364.

*To all whom it may concern:*

Be it known that I, GEORGE OTIS TUCKER, a citizen of the United States, residing at Charleston, in the county of Coles and State of Illinois, have invented new and useful Improvements in Nut-Locks, of which the following is a specification.

This invention relates to nut-locks; and it has for its object to provide an improved device of this kind that will be inexpensive to manufacture and that will prevent the separation of the nut from the bolt except by the destruction of one of said parts.

Other objects and advantages will appear in the following description and will be more particularly pointed out in the claim.

Figure 1:
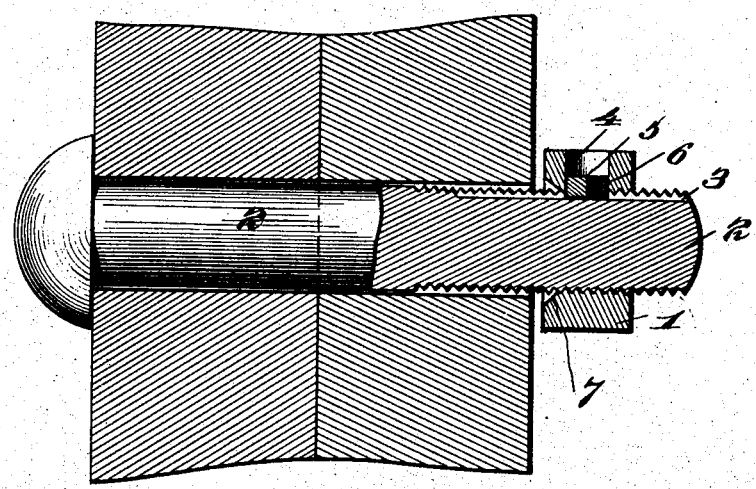
Figure 2:
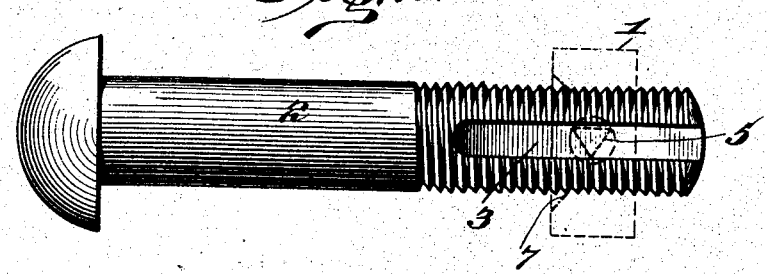
Figure 3:
Figure 4:

In the drawings, Figure 1 is a vertical section of the nut and an end of the bolt with the distorting device mounted in position before locking. Fig. 2 is a plan view of the bolt with the nut and distorting device shown in dotted lines. Fig. 3 is a plan view of the nut, and Fig. 4 is a perspective view of the distorting device.

The underlying principle of my invention is the introduction of a device into a position so that when the nut 1 is turned relatively to the bolt 2 the threads of the two parts are destroyed or distorted, so that a reversal of the movement cannot take place. This is accomplished in the present instance by providing the bolt 2 with one or more longitudinal grooves 3 and the nut 1 with one or more radial or other openings 4. The bolt 2 and nut 1 are fitted together as usual until they have nearly reached the end of their relative movement, when an opening 4 is caused to aline with a groove 3 and a distorting-body 5 of greater height or diameter than the depth of the groove 3 and preferably having sharp edges 6 to cut its way through the parts is introduced through the opening 4 into the said groove 3. The relative movement of the bolt and nut is now completed. This movement first causes the distorting-body 5 to be gripped between one wall of the radial opening 4 and the opposite wall of the groove 3 and then to be carried between the two parts. As it passes between the bolt and the nut the metal adjacent the body 5 in both the nut and the bolt is compressed, thereby distorting or destroying the thread and preventing the reversal of the movement. The metal of the body 5 is preferably harder than the metal of the bolt and the nut.

When a bolt is employed for holding metal objects together, the threads which are fitting within the object becomes worn, so that when it is desired to tighten the nut there are no threads on the bolt for this purpose. To overcome this difficulty, I bevel at 7 the nut around the bolt-opening, or, in other words, ream out two or more threads, so that there is provided several threads on the bolt which do not become worn and with which the nut may engage.

While I have shown and described the preferred embodiment of my invention, I desire it to be understood that I am not to be limited to the form herein shown and that I may make various changes in the form, proportion, and minor details of the invention within the scope of the appended claim without departing from the spirit or sacrificing any of the advantages of my invention.

Having thus described my invention, what I claim, and desire to secure by Letters Patent, is—

In a nut-lock, the combination with a bolt provided with a longitudinal groove, and a nut provided with a radial opening, of a body of a size greater than the depth of the groove, adapted to be fitted into the opening and shaped to pass between and distort the threads of the nut and the bolt on a relative movement of said parts.

The foregoing specification signed this 23d day of July, 1904.

GEORGE OTIS TUCKER.

In presence of—
R. C. ALEXANDER,
C. T. GOODMAN.